United States Patent
Watanabe et al.

[11] Patent Number: 6,022,438
[45] Date of Patent: Feb. 8, 2000

[54] METHOD FOR PRODUCING STEERING WHEEL TO WHICH LIQUID PRESSURE TRANSFER PRINT IS APPLIED

[75] Inventors: Kiyoshi Watanabe; Nobuyuki Hori, both of Shimizu; Hidekazu Hanada, Ihara-gun; Hisao Tanaka, Fuji; Koji Sugiyama, Numazu; Sadayuki Kawakami, Fujinomiya, all of Japan

[73] Assignees: Cubic Co., Ltd.; Nihon Plast Co., Ltd., both of Shizuoka, Japan

[21] Appl. No.: 09/088,899

[22] Filed: Jun. 2, 1998

[30] Foreign Application Priority Data

Jun. 3, 1997 [JP] Japan .................................. 9-160576

[51] Int. Cl.⁷ .......................... B44C 1/165; B32B 31/00; B05C 3/00; B41M 3/12
[52] U.S. Cl. ......................... 156/230; 156/240; 156/277; 156/384; 118/402; 427/149
[58] Field of Search .................................. 156/280, 236, 156/240, 277, 384, 542; 118/402, 403, 416, 423, 428, 503; 427/149, 430.1

[56] References Cited

U.S. PATENT DOCUMENTS

| | | |
|---|---|---|
| 2,489,987 | 11/1949 | Barnola . |
| 4,010,057 | 3/1977 | Nakanishi . |
| 4,229,239 | 10/1980 | Arai et al. . |
| 4,231,829 | 11/1980 | Marui et al. . |
| 4,436,571 | 3/1984 | Nakanishi . |

FOREIGN PATENT DOCUMENTS

| | | |
|---|---|---|
| 56-19788 | 2/1981 | Japan . |
| 57-45090 | 3/1982 | Japan . |
| 57-64589 | 4/1982 | Japan . |
| 61-5981 | 1/1986 | Japan . |
| 4-122673 | 4/1992 | Japan . |

*Primary Examiner*—David A. Simmons
*Assistant Examiner*—J. A. Lorengo
*Attorney, Agent, or Firm*—Wenderoth, Lind & Ponack, L.L.P.

[57] ABSTRACT

A method for producing a steering wheel to which a liquid pressure transfer print is applied. In this method, by adjusting a transfer angle formed when the steering wheel is pressed onto a transfer film and selecting a part in a rim section at which the wheel begins to be brought into contact with the transfer film, a joint line of a transfer pattern is made invisible from the driver-side, and pattern-missing and pattern-distortion can be eliminated or decreased, resulting in a fine and precise liquid pressure transfer print being applied to the steering wheel. This method is characterized by that a front-face of the steering wheel is faced to the transfer film floated and advanced on a liquid-surface, the transfer angle is determined to be e.g., 30 to 45°, and first contact of the steering wheel with the transfer film occurs at a larger rim arc which is apart from portions where spokes are connected to the rim section, respectively.

18 Claims, 6 Drawing Sheets

METHOD FOR PRODUCING STEERING WHEEL TO WHICH LIQUID PRESSURE TRANSFER PRINT IS APPLIED

BACKGROUND OF THE INVENTION

This invention relates to a method for producing a steering wheel on which a transfer ink is printed, by bringing the steering wheel into contact with a transfer ink-coated film floated and advanced on a water-surface.

Figure 6:
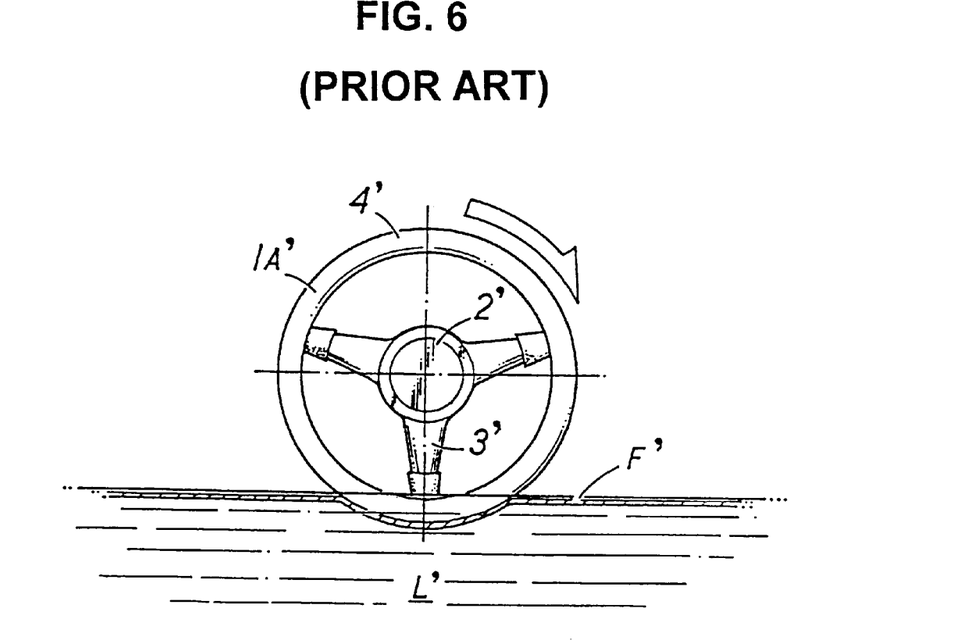
FIG. 6 is a side elevation view showing a manner of applying a liquid pressure transfer print on a rim section of a steering wheel in accordance with a conventional method.

Conventionally, a pattern such as wood grain pattern has been printed onto a rim section of a steering wheel by utilizing a technique of a liquid pressure transfer print. For example, Japanese Patent Laid-Open Publication No. 61-5981 discloses a conventional technique of a liquid pressure transfer print for the rim section of the steering wheel. In this conventional technique, as shown in FIG. 6, the steering wheel 1A' is set upright so that its rim section 4' is brought into contact with a transfer film F', while the steering wheel 1A' is rotated and delivered in the traverse direction for printing a wood grain pattern on the whole surface around the rim section 4'. By doing so, this conventional technique has an effect that the rim section 4' looks like as if it were manufactured by forming a round wood rod.

In such a conventional technique of a liquid pressure transfer print, a joint line of the transfer pattern is located at the most inner portion of the steering wheel, resulting in the joint line being clearly visible from the driver-side. In a conventional method related to a liquid pressure transfer print for the rim section of the steering wheel, manufactures were likely to think that the joint line of the transfer pattern was not so serious problem, because, they judged the design of the rim section only by whether, onto the surface of the rim section, the pattern of a wood grain, e.g., cross grain or straight grain of wood, was printed or not.

However, in these days, a front panel and side panels often have grain patterns of precious wood, hence, also in the case of a steering wheel, not a grain pattern of common wood but a grain pattern of precious wood is desired. That is to say, high level design is required in the steering wheel, thus, the above mentioned joint line of the transfer pattern becomes an important matter.

Figure 7:
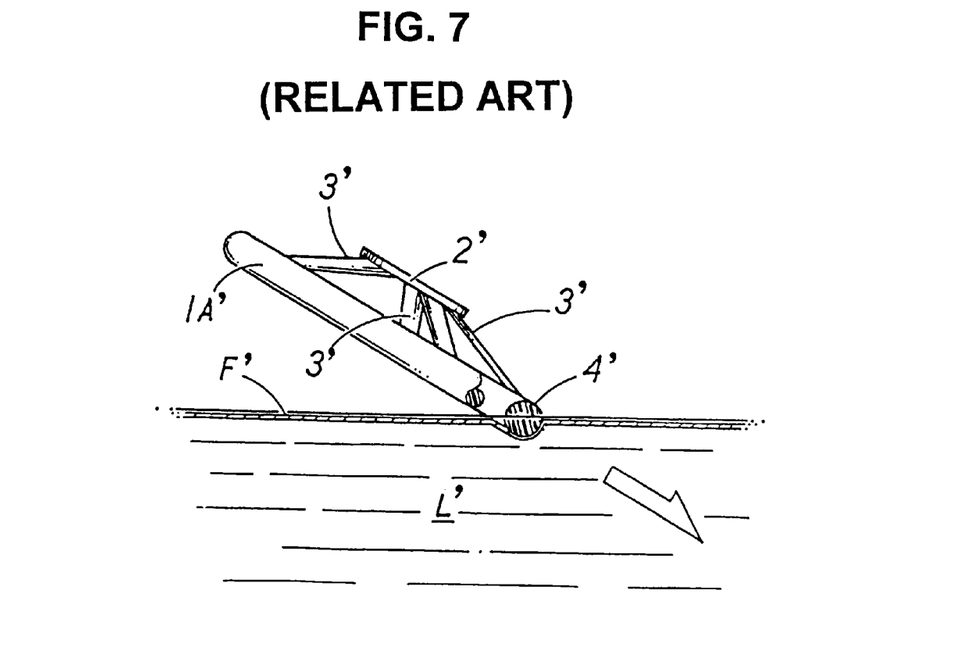
FIG. 7 is an illustration showing a test embodiment where a joint line of a transfer pattern is located at the back-side of the rim section of the steering wheel.

Therefore, instead of the conventional method of a liquid pressure transfer print disclosed in, for example, the above Japanese Patent Laid-Open Publication No. 61-5981, the inventors tried a method for attaining a steering wheel with a joint line of a transfer pattern located at the back-side of the wheel so as not to be visible from the driver-side. In the method tried by the inventors, as shown in FIG. 7, a steering wheel 1A' was immersed straight in a transfer liquid at a predetermined transfer angle formed when the steering wheel 1A' is pressed onto a transfer film F'. In this trial, was found a specific problem accompanied with the liquid pressure transfer print for the steering wheel 1A'. More particularly, in a steering wheel 1A', it is difficult to apply uniformly a liquid pressure transfer print of e.g., a wood grain pattern to the whole surface around an annular rim section 4' provided with spokes 3' extending from its inner side, resulting in pattern-missing and pattern-distortion occurring.

The pattern-missing means a situation where a large area of the pattern is missing at a space requiring a transfer print. In the steering wheel, when the part of the rim section or spoke is immersed in the transfer liquid while it is brought into contact with the transfer film, this film might be used up and removed. Accordingly, after that, when the other part of the rim section is immersed in the transfer liquid, there is no transfer film, resulting in pattern-missing occurring.

The pattern-distortion occurs in the following manner. When a transfer film is immersed partly in a transfer liquid together with an object to be printed, the immersed part of the film pulls another part of the film remained on the liquid-surface. In parts of the object which are simultaneously immersed together with the film, the resultant pattern does not deform, since tension is not caused there, although tension is caused on the following part of the transfer film remained on the liquid-surface. A steering wheel has, at the preceding-side and trailing-side in its delivering direction, two quarter-arc portions each of which is immersed simultaneously in the transfer liquid. Also, the steering wheel has, at the right-side and left-side of its delivering direction, two quarter-arc portions each of which is immersed gradually with a time lag. Among these quarter-arc portions, the pattern-distortion occurs in the above right and left portions each of which is immersed gradually with a time lag.

Therefore, a solution has been considered for eliminating or minimizing such pattern-missing and pattern-distortion. However, some kinds of steering wheels have parts requiring no liquid pressure transfer print. For example, grip parts covered with leather and spoke-connecting portions in a rim section are not to be printed. Thus, the inventors have supposed that even if the pattern-missing and pattern-distortion might occur in the grip parts and spoke-connecting portions, by utilizing this situation, a liquid pressure transfer print can be applied to only parts requiring good appearance, which results in a desired steering wheel.

SUMMARY OF THE INVENTION

The present invention is attained on the basis of knowledge resulted from a lot of tests performed under the above understanding. By selecting a part in a rim section at which a transfer print is started and by adjusting a transfer angle on starting this, the following objects of the present invention can be obtained. Precisely, a joint line of a pattern can be located at the back-side of a steering wheel so as not to be visible from the driver-side; pattern-missing and pattern-distortion can be eliminated or minimized; a fine, precise, and appropriate liquid pressure transfer print can be performed in accordance with a specific shape of each steering wheel and a manner of use thereof. As a result, the inventors have developed the method for producing the steering wheel satisfying high level design required now and in future.

In the first aspect of the present invention, is provided a method for producing a steering wheel to which a liquid pressure transfer print is applied and which includes an annular rim section, a central hub, and spokes connecting the hub and rim section, the method comprising: facing a front-face of the steering wheel, which is inclined toward a transfer direction, to a transfer film floated and advanced on a liquid-surface; and starting to bring the steering wheel into contact with the transfer film at, in the rim section, a part which is apart from portions where the spokes are connected, respectively.

According to the first aspect of the present invention, the front-face of the steering wheel is faced to the transfer film and inclined to the transfer direction. Further, contacting of the steering wheel with the transfer film is started at the part which is apart from the portions where the spokes are connected to the rim section. Accordingly, a joint line of a transfer pattern is located at the back-side of the steering wheel. Further, since the immersing of the steering wheel is started at the part which is apart from the portions where the spokes are connected to the rim section, the transfer film should not be used up precedently. Therefore, large pattern-missing leading to a defect does not occur.

In the second aspect of the present invention, is provided a method for producing a steering wheel to which a liquid pressure transfer print is applied and which includes an annular rim section, a central hub, and spokes connecting the hub and rim section, the method comprising: facing a front-face of the steering wheel, which is inclined toward a transfer direction, to a transfer film floated and advanced on a liquid-surface; and starting to bring the steering wheel into contact with the transfer film at, in the rim section, a part selected from an upper part and a lower part both which are apart from grip parts located at the right-side and left-side of the rim section, respectively.

According to the second aspect of the present invention, the front-face of steering wheel is faced to the transfer film and inclined to the transfer direction. Further, contacting of the steering wheel with the transfer film is started at the upper part or the lower part which is apart from the grip parts located at the right-side and left-side of the rim section. Accordingly, a joint line of a transfer pattern is located at the back-side of the steering wheel. At the grip parts located at the right-side and left-side of the rim section, the transfer pattern might be distorted as if it were flown. However, by covering the grip parts with leather and the like, the pattern-distortion is not visible. Accordingly, to the upper and lower parts of the rim section, a fine liquid pressure transfer print can be applied precisely.

In the third aspect of the present invention, is provided a method for producing a steering wheel to which a liquid pressure transfer print is applied and which includes an annular rim section, a central hub, and spokes connecting the hub and rim section, the method comprising: facing a front-face of the steering wheel, which is inclined toward a transfer direction, to a transfer film floated and advanced on a liquid-surface; and starting to bring the steering wheel into contact with the transfer film at, in the rim section, a part which is apart from portions where the spokes are connected to the rim section, respectively, and which is also apart from grip parts located at the right-side and left-side of the rim section, respectively.

According to the third aspect of the present invention, the front-face of steering wheel is faced to the transfer film and inclined to the transfer direction. Further, contacting of the steering wheel with the transfer film is started at the part which is apart from the portions where the spokes are connected to the rim section and which is also apart from the grip parts located at the right-side and left-side of the rim section. Accordingly, pattern-missing does not occur. In addition, the pattern-distortion occurs, if any, at only the grip parts. The grip parts are covered with leather and the like.so that the pattern-distortion is not visible. Thus, the resultant steering wheel to which the liquid pressure transfer print is applied has desirable quality.

In one preferred embodiment of the present invention, the steering wheel includes a larger rim arc and a smaller rim arc, which have different lengths and are placed between the spokes so as to be opposed to each other, and the part at which the steering wheel begins to be brought into contact with the transfer film is the larger rim arc.

According to this embodiment of the present invention, in a steering wheel provided with two spokes or four spokes, any spoke is not provided at the preceding side of the smaller rim arc in the advancing direction. Thus, the spokes do not disturb the transfer film from being contacted closely around the smaller rim arc. Therefore, to the whole periphery of the larger rim arc and smaller rim arc in cross section, the liquid pressure transfer print can be applied precisely without pattern-missing and pattern-distortion.

In another preferred embodiment of the present invention, the inclination toward the transfer direction is determined by a transfer angle formed when the steering wheel is pressed onto the transfer film, of 20 to 60°.

According to this embodiment of the present invention, the joint line of the transfer pattern is located at the back-side of the steering wheel and is invisible from the driver-side. Further, since pattern-distortion and pattern-missing do not occur, the resultant steering wheel brings the impression of high quality to a driver and the like.

In a further preferred embodiment of the present invention, the above transfer angle is 30 to 45°.

According to this embodiment of the present invention, since the transfer angle is near the mid point of the above preferable angle range, the transfer print can be applied successfully. Further, for steering wheels in several kinds of shape and size, the transfer print can be applied uniformly and precisely.

DETAILED DESCRIPTION OF THE PREFERRED EMBODIMENTS

Now, the present invention will be explained referring to an embodiment shown in the drawings. The explanation will be carried out in the following. First, one embodiment of a steering wheel 1 to which a liquid pressure transfer print is applied and which is produced by the method in accordance with the present invention will be described. Next, a liquid pressure transfer print line 10 performing the liquid pressure transfer print will be generally explained. Then, the method for producing the steering wheel to which the liquid pressure transfer print is applied in accordance with the present invention as well as operation of the liquid pressure transfer print line 10 will be explained.

First, the steering wheel 1 to which the liquid pressure transfer print is applied is explained. As shown in FIGS. 1A to 2B, the steering wheel 1 includes a central hub 2, which is connected to a steering column of an automobile, spokes 3, which are extending radially and outwardly from the hub 2 toward the front-side in FIGS. 1A and 2A, and a rim section 4, which is connected to the fore ends of the spokes 3. In the steering wheel 1 to which the liquid pressure transfer print is applied in accordance with the present invention, directions are defined as follows. The upper, lower, right and left sides of the steering wheel 1 to which the liquid pressure transfer print is applied are corresponding to the upper, lower, right and left sides in the front view of FIG. 2A, respectively. The front-face 1a of the steering wheel 1 to which the liquid pressure transfer print is applied is corresponding to the face 1a expressed in FIG. 2A, while the back face 1b is corresponding to the face 1b opposite to the front-face 1a. In the description of the present invention, a steering wheel which has been subjected to a liquid pressure transfer print process is called as a steering wheel 1 to which the liquid pressure transfer print is applied. On the other hand, a steering wheel which is not yet treated in the liquid pressure transfer print process is called as just a steering wheel 1A.

The steering wheel 1 to which the liquid pressure transfer print is applied will be explained more closely. There are four spokes 3; upper right spoke 3a, lower right spoke 3b, upper left spoke 3c and lower left spoke 3d. A part between the upper right spoke 3a and upper left spoke 3c in the rim section 4 is called as a larger rim arc 4a. On the other hand, a part between the lower right spoke 3b and lower left spoke 3d in the rim section 4 is called as a smaller rim arc 4b. To the larger rim arc 4a and smaller rim arc 4b, the liquid pressure transfer print is applied so as to have a wood grain pattern as one example of a transfer pattern. Further, external surfaces of the larger rim arc 4a and smaller rim arc 4b are covered with a top-coat 6. In the rim section 4, the arcs other than the larger and smaller rim arcs, each of which is located between the larger rim arc 4a and smaller rim arc 4b, and each of which is treated, for example, covered with leather 7. As shown in this embodiment, the upper-side of steering wheel 1 to which the liquid pressure transfer print is applied defines the larger rim arc 4a having the shape of substantial semicircle and having no spoke 3. Such arrangement is used commonly in a steering wheel in order to secure visibility of automobile meters or gauges.

According to the present invention, the liquid pressure transfer print applied to the above larger rim arc 4a and smaller rim arc 4b can be fine and precise very much without pattern-missing and pattern-distortion. As shown in the enlarged view showing the back-side 1b of a top portion 1c in FIG. 1B, a joint line 5a of a pattern 5 is located away from the front-face 1a of the steering wheel 1 at an angle larger than 90° so as to be on the back-side 1b. Thus, the joint line 5a of the transfer pattern 5 is invisible from the driver-side, which gives the impression of high quality as if the steering wheel 1 were manufactured from e.g. precious wood.

What characterizes the steering wheel 1 to which the liquid pressure transfer print is applied in accordance with the embodiment of the present invention is caused from the following producing method (explained more closely later). Precisely, the liquid pressure transfer print is performed by facing the front-face 1a of the steering wheel 1A to a liquid-surface and pressing the steering wheel 1A onto a transfer film F at a transfer angle θ of about 45°. The pressing of the steering wheel 1A onto the transfer film F begins with contacting of the top portion 1c of the steering wheel 1A with the transfer film F and completes with contacting of a bottom portion 1d of the steering wheel 1A with the transfer film F.

Figure 1A:
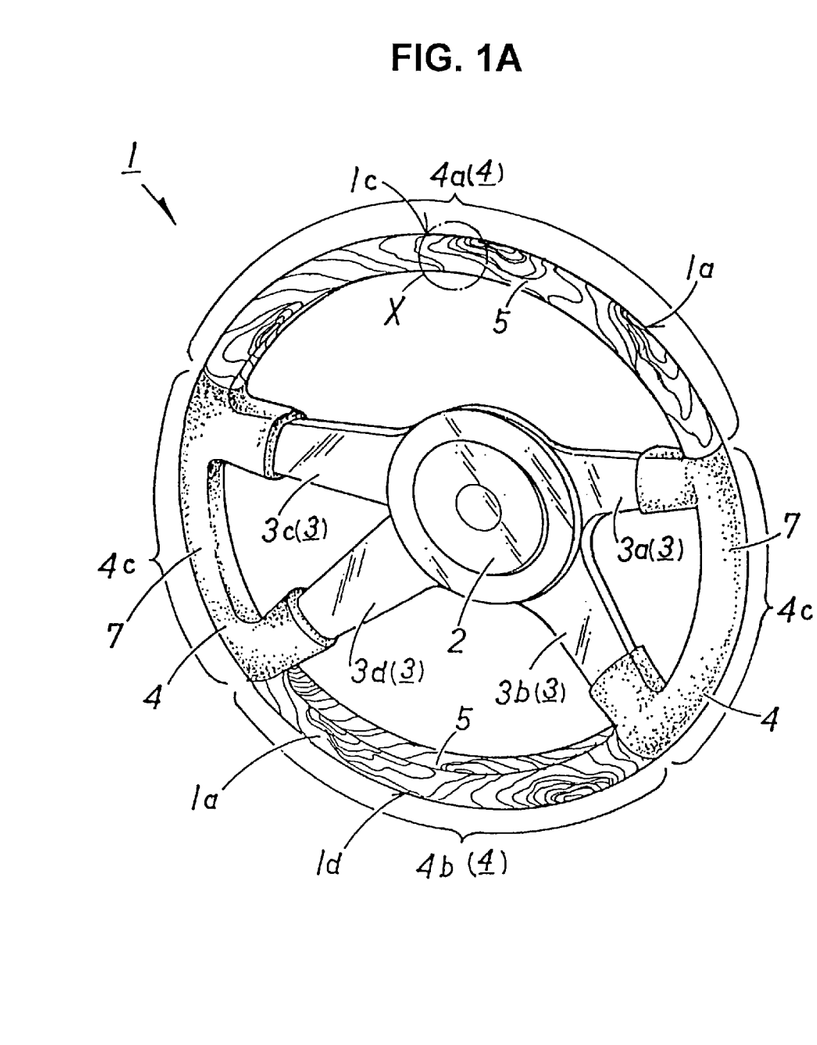
FIG. 1A is a perspective view illustrating an embodiment of a steering wheel to which a liquid pressure transfer print is applied according to the present invention, to show the back-side of a rim section thereof.
Figure 1B:
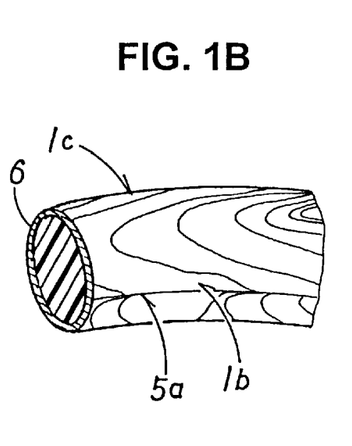
FIG. 1B is a fragmentary enlarged perspective view of a part X of FIG. 1A, showing a top portion of the rim section.
Figure 2A:
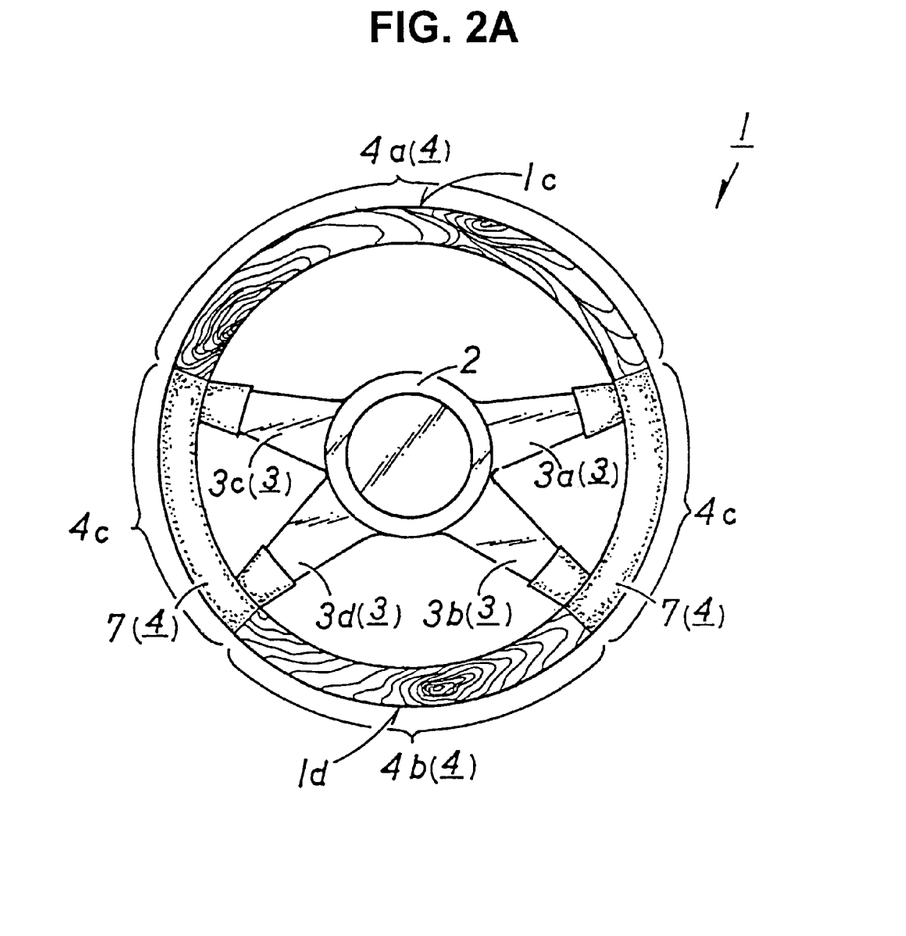
FIG. 2A is a front view of the steering wheel of FIG. 1.
Figure 2B:
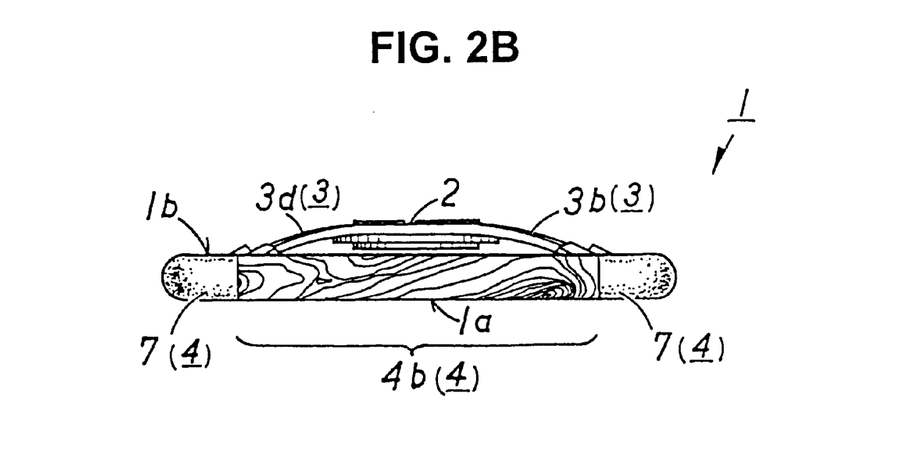
FIG. 2B is a bottom plan view of the steering wheel while the front-face of the steering wheel faces downward.
Figure 3:
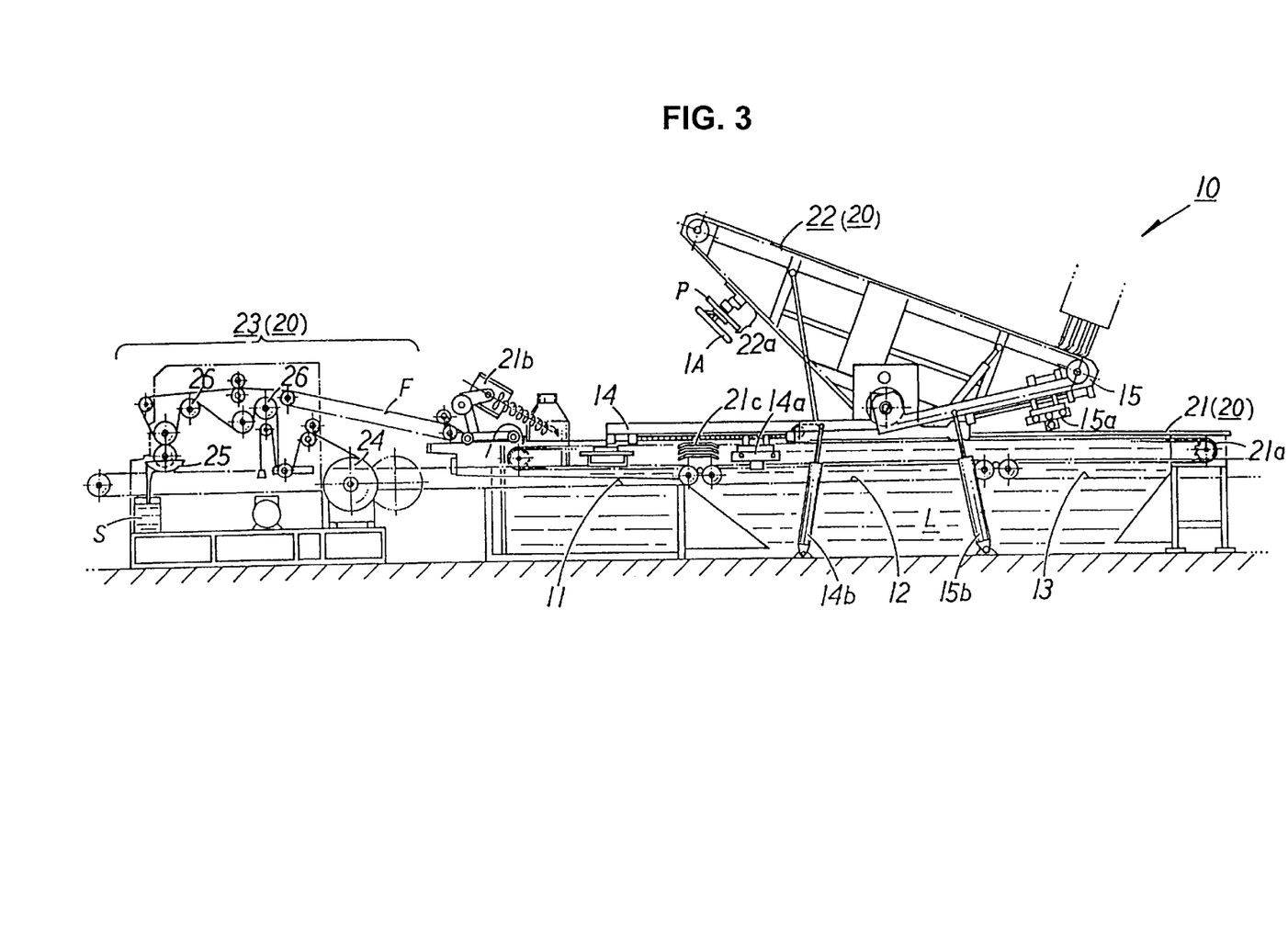
FIG. 3 is a side elevation view generally showing a liquid pressure transfer print line.
Figure 4:
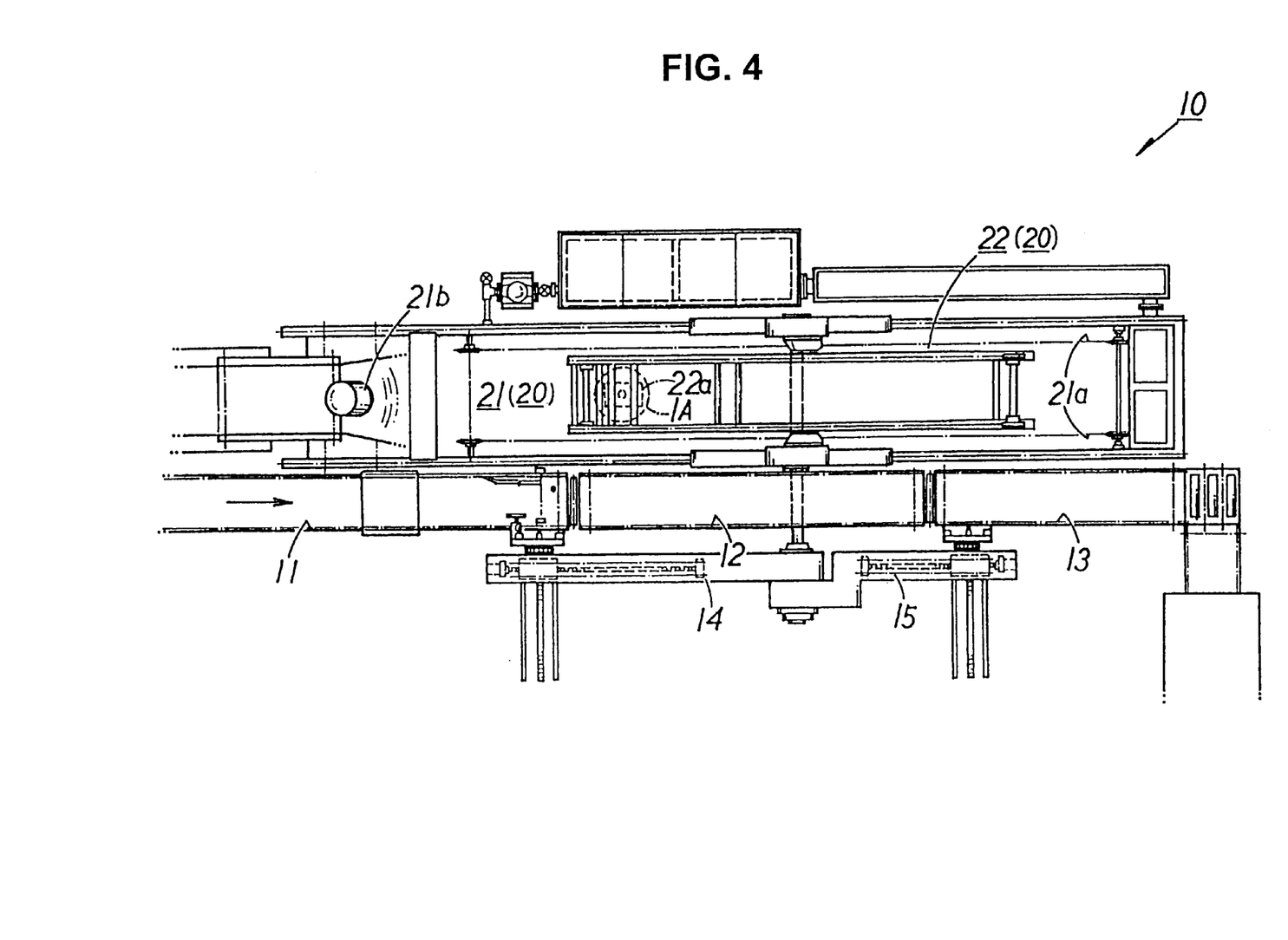
FIG. 4 is a plan view showing the liquid pressure transfer print line of FIG. 3.

The embodiment of the steering wheel 1 to which the liquid pressure transfer print is applied has been explained above. Now, the liquid pressure transfer print line 10 will be explained generally. The liquid pressure transfer print line 10 includes, as shown in FIGS. 3 and 4, a liquid pressure transfer unit 20; a feed conveyer 11, a connecting conveyer 12 and a discharge conveyer 13, which are placed successively along the liquid pressure transfer unit 20; and an automatic feed unit 14 and an automatic discharge unit 15, which are placed above the connecting conveyer 12 and lateral to the liquid pressure transfer unit 20.

The liquid pressure transfer unit 20 comprises a transfer vessel 21 for containing water; a transfer conveyer 22 which is placed above the transfer vessel 21 and which is provided with object holders 22a so as to be spaced at predetermined intervals; and a transfer film feed unit 23. The water contained in the transfer vessel 21 is circulated to flow slowly to the right-side in FIGS. 3 and 4 by means of a circulation line and a pump (both are not shown in figure). At the both sides of the transfer vessel 21, there are guide chains 21a. Above the starting-side end of the transfer vessel 21, there is a blower unit 21b. The transfer film F is advanced to the right-side in FIGS. 3 and 4 by means of water stream in the transfer vessel 21, the guide chains 21a and the blower unit 21b. Wave suppressing boards 21c are used for maintaining the liquid-surface to be horizontal.

In the transfer conveyer 22, its carrying surface, on which the steering wheel 1A is mounted to be delivered to the transfer vessel 21, is set at an inclined angle of about 45° with respect to the liquid-surface of the transfer vessel 21. The transfer conveyer 22 is configured so as to be inclined freely to the right-side and left-side in FIG. 3. It is preferable that the inclined angle can be determined properly in the range of 20 to 60°. The object holders 22a in the transfer conveyer 22 are each configured to hold and support the steering wheel 1A with its face facing downward, its rim section 4 being parallel with the above carrying surface, its larger rim arc 4a and smaller rim arc 4b being located at the lower-side and at the upper-side, respectively.

The transfer film feed unit 23 comprises a film roll 24, which has a water-soluble transfer film F wound in a roll state; a solvent tank 25, which stocks an activator S for providing a transfer ink printed on a carrier sheet in a dry state with adhesiveness to render transferable (which is called as activation in this specification); and feed rolls 26. The transfer film F drawn out from the film roll 24 is activated by means of the activator S contained in the solvent tank 25, then, the activated film F is advanced continuously to the transfer vessel 21. The activator S is prepared by blending e.g. resin, pigment, solvent, plasticizer and the like in optimal proportion. Alternatively, a solvent such as thinner can be simply used as the activator S.

The automatic feed unit 14 includes a grip unit 14a. The steering wheel 1A, which has been delivered on the feed conveyer 11, is gripped by the grip unit 14a and lifted by a pivot cylinder 14b so as to be secured in the object holder 22a in the transfer conveyer 22. In a procedure contrary to this, the automatic discharge unit 15 is operated. The automatic discharge unit 15 includes a grip unit 15a and a pivot cylinder 15b. The steering wheel 1A, to which the liquid pressure transfer print has been already finished, is delivered from the object holder 22a in the transfer conveyer 22 to the automatic discharge unit 15 and then, delivered to and mounted on the discharge conveyer 13. If any defective steering wheel 1A is fed on the feeding conveyer 11, since it should not be delivered to the liquid pressure transfer print unit 20, the connecting conveyer 12 is used to deliver the defective wheel to a defective discharge line, which is provided separately.

One example of liquid pressure transfer print line 10 used for the method for producing the steering wheel to which the liquid pressure transfer print is applied in accordance with the present invention has been explained above. Now, the operation of this line 10 will be explained. Further, the method for producing the steering wheel to which the liquid pressure transfer print is applied in accordance with the present invention will be also explained at the same time.

(1) Feeding Transfer Film

Figures 5A, 5B:
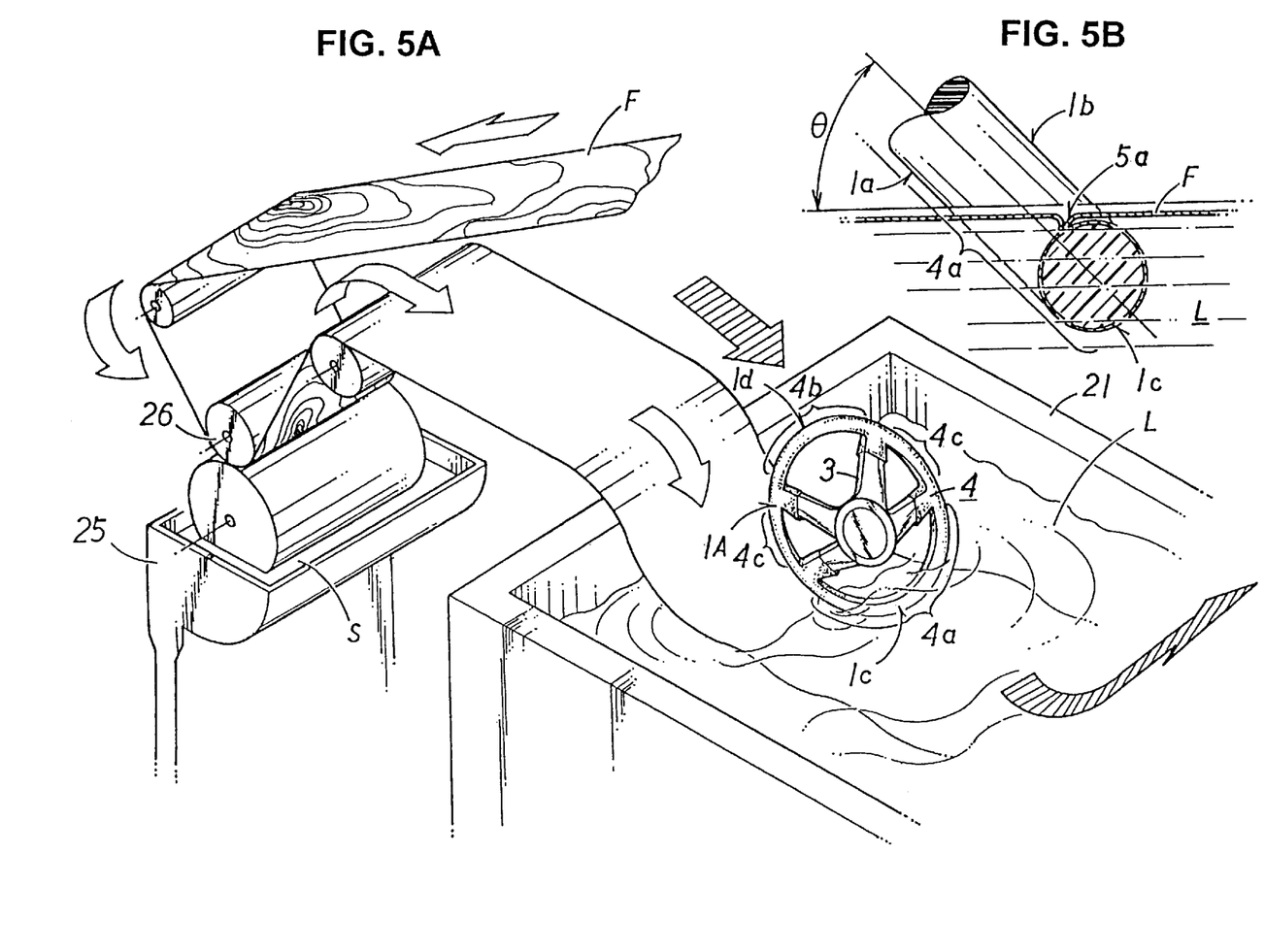
FIG. 5A is a perspective view showing a manner of applying a liquid pressure transfer print to the steering wheel.
FIG. 5B is a side view, partly in section, showing how to apply the liquid pressure transfer print to the top portion of the steering wheel.

As shown in FIG. 5A, the transfer film F which has been drawn from the film roll 24 is coated with the activator S on a surface thereof, to which the transfer ink is applied, and then fed onto the surface of the transfer liquid L in the transfer vessel 21. The transfer film F on which the activator S has been coated is softened and swollen due to absorption of water, resulting in the transfer film F being extending in all directions. Since the transfer film F is usually stocked in the form of film roll 24, the coat of the transfer film F is in a dry state. Thus, the activator S is used for coating the transfer film F in order to provide the transfer ink coating face with adhesiveness. In this embodiment, the activator S is coated on the transfer film F before the film is advanced to the transfer vessel 21, but this coating may be performed after the transfer film F is advanced to the transfer vessel 21.

(2) Feeding Steering Wheel

The object to be printed, steering wheel 1A supported by a support P is delivered from the feed conveyer 11 to the automatic feed unit 14 where the steering wheel 1A is gripped by the grip unit 14a. Then, the steering wheel 1A is delivered to the object holder 22a of the transfer conveyer 22. In the steering wheel 1A, the parts to which the liquid pressure transfer print is not to be applied, such as hub 2 and spokes 3, were previously masked properly. However, in this embodiment, for the grip parts 4c, masking or similar treatment is unnecessary, because they will be covered with leather 7 after the liquid pressure transfer print is applied.

(3) Applying Liquid Pressure Transfer Print

In the above operation, the steering wheel 1A is set with its front-face 1a facing to the liquid-surface, and is pressed onto the transfer film F at the transfer angle θ of 45° with respect to the transfer film F, which characterizes the method for producing the steering wheel to which the liquid pressure transfer print is applied in accordance with the present invention. Further, the steering wheel 1A begins to be brought into contact with the transfer film F at its top portion 1c and finishes contacting with the transfer film F at its bottom portion 1d. For this purpose, the steering wheel 1A is set so that the top portion 1c on the larger rim arc 4a and the bottom portion 1d on the smaller rim arc 4b are located at the lowest and the highest, respectively.

The steering wheel 1A, which is set and secured to the object holder 22a as explained above, is approached to the transfer film F, which has the suitable degree of extending. Then, the steering wheel 1A is immersed in water together with the film F, which is pressed downward so that, as shown in FIG. 5B, the transfer film F is contacted closely so as to cover in the form of film coat along the configuration of the external surface of the steering wheel 1A. Finally, the transfer pattern 5 is transfer printed on the larger rim arc 4a and smaller rim arc 4b.

According to the above method for producing the steering wheel to which the liquid pressure transfer print is applied, the steering wheel 1A is set so that the larger rim arc 4a and smaller rim arc 4b are positioned at the first and last, respectively. Thus, the transfer print is not disturbed by the spokes 3 and the transfer film F can be contacted closely to every part of the rim section 4 requiring transfer print. Further, since the parts of the rim section 4 requiring transfer print are arranged so as to be symmetric with respect to the vertical axis, the transfer film F is not pulled toward the right nor left with respect to the advancing direction. Accordingly, pattern-distortion and pattern-missing do not occur. Further, the steering wheel 1A is set so that its front-face 1a is faced to the transfer film F at the transfer angle of 45° so that the joint line 5a of the transfer pattern 5 is located at the back-side 1b of the rim section 4, as shown in FIG. 5B and the enlarged view of FIG. 1B. When the liquid pressure transfer print is applied to the grip parts 4c with pattern-distortion, and if this pattern-distortion decreases its decorative product quality very much, the grip parts can be covered with leather 7.

Now, the transfer angle θ will be explained. From the results of tests, if the liquid pressure transfer print applied to the steering wheel begins with its larger rim arc 4a, the transfer angle θ of 20 to 60° is preferable. Because, by determining this angle range, the liquid pressure transfer print can be applied without pattern-missing and pattern-distortion, or with a commercially negligible amount of pattern-missing and pattern-distortion. On the other hand, in the case of other transfer angle, i.e., transfer angle θ being smaller than 20° or larger than 60°, the pattern-missing and pattern-distortion tend to occur very much. As a result, the transfer angle θ which is most suitable for mass production of steering wheels to which the liquid pressure transfer print is applied is 30 to 45°, which is near the mid point of the above transfer angle range, by which the transfer print can be performed without pattern-missing and pattern-distortion.

(4) Removing Steering Wheel

The steering wheel 1A for which the liquid pressure transfer print is already finished as stated above is removed from the object holder 22a in the transfer conveyer 22 through means of the automatic discharge unit 15 and delivered to the discharge conveyer 13.

(5) Removing Carrier Sheet and Drying Steering Wheel

Since part of the carrier sheet unsolved into the transfer liquid L is remained on the steering wheel 1A for which the liquid pressure transfer print is finished as explained above, the steering wheel 1A is cleaned by means of showering and the like for removing perfectly the remained carrier sheet, followed by drying the steering wheel 1A.

(6) Forming Top Coat

The steering wheel 1A on which the transfer pattern 5 is printed can be used as it is as the steering wheel 1 to which the liquid pressure transfer print is applied in accordance with the present invention. However, by forming a transparent top coat 6 by means of spray coating and the like onto the surface of parts having the transfer pattern, the gloss and depth of such parts can be enhanced. The top coat 6 is usually polished by buff and the like.

While preferred embodiments of the invention have been described with a certain degree of particularly with reference to the drawings, obvious modifications and variations are possible in light of the above teachings. It is therefore to be understood that within the scope of the appended claims, the invention may be practiced otherwise than as specifically described.

What is claimed is:

1. A method for producing a steering wheel to which a liquid pressure transfer print is applied and which includes an annular rim section, a central hub, and spokes connecting the hub and rim section, said method comprising:

facing a front-face of said steering wheel, which is inclined toward a transfer direction, to a transfer film floated and advanced on a liquid-surface; and starting to bring said steering wheel into contact with said transfer film at, in said rim section, a part which is apart from portions where said spokes are connected, respectively.

2. A method for producing a steering wheel to which a liquid pressure transfer print is applied and which includes an annular rim section, a central hub, and spokes connecting the hub and rim section, said method comprising:

facing a front-face of said steering wheel, which is inclined toward a transfer direction, to a transfer film floated and advanced on a liquid-surface; and starting to bring said steering wheel into contact with said transfer film at, in said rim section, a part selected from an upper part and a lower part both which are apart from grip parts located at the right-side and left-side of said rim section, respectively.

3. A method for producing a steering wheel to which a liquid pressure transfer print is applied and which includes an annular rim section, a central hub, and spokes connecting the hub and rim section, said method comprising:

facing a front-face of said steering wheel, which is inclined toward a transfer direction, to a transfer film floated and advanced on a liquid-surface; and starting to bring said steering wheel into contact with said transfer film at, in said rim section, a part which is apart from portions where said spokes are connected to said rim section, respectively, and which is also apart from grip parts located at the right-side and left-side of said rim section, respectively.

4. A method for producing a steering wheel to which a liquid pressure transfer print is applied as defined in claim 1, wherein said steering wheel includes a larger rim arc and a smaller rim arc, which have different lengths and are placed between said spokes so as to be opposed to each other, said part at which said steering wheel begins to be brought into contact with said transfer film being said larger rim arc.

5. A method for producing a steering wheel to which a liquid pressure transfer print is applied as defined in claim 2, wherein said steering wheel includes a larger rim arc and a smaller rim arc, which have different lengths and are placed between said spokes so as to be opposed to each other, said part at which said steering wheel begins to be brought into contact with said transfer film being said larger rim arc.

6. A method for producing a steering wheel to which a liquid pressure transfer print is applied as defined in claim 3, wherein said steering wheel includes a larger rim arc and a smaller rim arc, which have different lengths and are placed between said spokes so as to be opposed to each other, said part at which said steering wheel begins to be brought into contact with said transfer film being said larger rim arc.

7. A method for producing a steering wheel to which a liquid pressure transfer print is applied as defined in claim 1, wherein the inclination toward said transfer direction is determined by a transfer angle formed when said steering wheel is pressed onto said transfer film, of 20 to 60°.

8. A method for producing a steering wheel to which a liquid pressure transfer print is applied as defined in claim 2, wherein the inclination toward said transfer direction is determined by a transfer angle formed when said steering wheel is pressed onto said transfer film, of 20 to 60°.

9. A method for producing a steering wheel to which a liquid pressure transfer print is applied as defined in claim 3, wherein the inclination toward said transfer direction is determined by a transfer angle formed when said steering wheel is pressed onto said transfer film, of 20 to 60°.

10. A method for producing a steering wheel to which a liquid pressure transfer print is applied as defined in claim 4, wherein the inclination toward said transfer direction is determined by a transfer angle formed when said steering wheel is pressed onto said transfer film, of 20 to 60°.

11. A method for producing a steering wheel to which a liquid pressure transfer print is applied as defined in claim 5, wherein the inclination toward said transfer direction is determined by a transfer angle formed when said steering wheel is pressed onto said transfer film, of 20 to 60°.

12. A method for producing a steering wheel to which a liquid pressure transfer print is applied as defined in claim 6, wherein the inclination toward said transfer direction is determined by a transfer angle formed when said steering wheel is pressed onto said transfer film, of 20 to 60°.

13. A method for producing a steering wheel to which a liquid pressure transfer print is applied as defined in claim 7, wherein said transfer angle is 30 to 45°.

14. A method for producing a steering wheel to which a liquid pressure transfer print is applied as defined in claim 8, wherein said transfer angle is 30 to 45°.

15. A method for producing a steering wheel to which a liquid pressure transfer print is applied as defined in claim 9, wherein said transfer angle is 30 to 45°.

16. A method for producing a steering wheel to which a liquid pressure transfer print is applied as defined in claim 10, wherein said transfer angle is 30 to 45°.

17. A method for producing a steering wheel to which a liquid pressure transfer print is applied as defined in claim 11, wherein said transfer angle is 30 to 45°.

18. A method for producing a steering wheel to which a liquid pressure transfer print is applied as defined in claim 12, wherein said transfer angle is 30 to 45°.

* * * * *